US008244892B2

(12) United States Patent
Carreel et al.

(10) Patent No.: US 8,244,892 B2
(45) Date of Patent: Aug. 14, 2012

(54) RADIO COMMUNICATION DEVICE AND RADIO COMMUNICATION SYSTEM COMPRISING SAME

(75) Inventors: Eric Carreel, Meudon (FR); Sébastien Royer De La Bastie, Paris (FR); Arnaud Mouiche, Paris (FR)

(73) Assignee: Thomson Licensing, Issy les Moulineau (FR)

( * ) Notice: Subject to any disclaimer, the term of this patent is extended or adjusted under 35 U.S.C. 154(b) by 1051 days.

(21) Appl. No.: 11/884,999

(22) PCT Filed: Feb. 22, 2006

(86) PCT No.: PCT/EP2006/060165
§ 371 (c)(1),
(2), (4) Date: May 30, 2008

(87) PCT Pub. No.: WO2006/089902
PCT Pub. Date: Aug. 31, 2006

(65) Prior Publication Data
US 2008/0250404 A1     Oct. 9, 2008

(30) Foreign Application Priority Data
Feb. 25, 2005 (FR) ....................... 05 01954

(51) Int. Cl.
*G06F 15/16* (2006.01)
*H04L 12/28* (2006.01)

(52) U.S. Cl. ........ 709/230; 709/208; 709/221; 709/227; 709/228; 709/229; 709/231; 709/232; 709/248; 370/379; 370/382; 370/252; 370/338; 370/463; 370/464; 370/465; 370/469; 370/280; 370/294; 370/373; 370/400; 370/401; 370/352; 370/354; 370/355; 370/356; 370/357; 455/422.1; 455/426.2; 455/434; 455/39; 455/40; 455/41.1; 455/41.2; 455/41.3; 455/424; 455/466; 455/456.5; 455/456.6; 455/3.03; 455/186.1; 455/502; 379/88.27; 379/88.28; 379/356.01; 379/357.02; 379/357.05

(58) Field of Classification Search ............... 709/28, 709/221, 230, 248, 208, 227, 228, 229, 231, 709/232; 455/422.1, 426.2, 434, 432.3, 41.2, 455/424, 456.1, 466, 456.5, 41, 3.03, 186.1, 455/41.3, 502, 550.1, 39, 40, 41.1; 370/379, 370/382, 252, 338, 463, 469, 280, 294, 373, 370/352, 355, 464, 465, 400–401, 354, 356, 370/357; 379/88.27, 88.28, 356.01, 357.02, 379/357.05, 58, 61, 63, 93, 96, 98

See application file for complete search history.

(56) References Cited

U.S. PATENT DOCUMENTS
6,349,204 B1    2/2002 Goetz et al.
(Continued)

FOREIGN PATENT DOCUMENTS
EP          0459344          12/1991
(Continued)

OTHER PUBLICATIONS

Chatschik Bisdikian, An overview of the Bluetooth Wireless Technology, IEEE Communications Magazine, Dec. 2001, p. 86-94.*
(Continued)

*Primary Examiner* — John Follansbee
*Assistant Examiner* — Saket K Daftuar
(74) *Attorney, Agent, or Firm* — Robert D. Shedd; Jeffrey M. Navon

(57) ABSTRACT

Radiocommunication device comprising a starter software module suitable to allow a simplified radio link of the radiocommunication device with a local radiocommunication network and allow a downloading, by this simplified radio link, of an update of a use software module that is contained in the radiocommunication device and that is suitable to enable a normal radio link to be set up.

20 Claims, 1 Drawing Sheet

U.S. PATENT DOCUMENTS

| | | | |
|---|---|---|---|
| 6,378,069 | B1 | 4/2002 | Sandler et al. |
| 6,622,017 | B1 | 9/2003 | Hoffman |
| 6,885,643 | B1* | 4/2005 | Teramoto et al. ............. 370/252 |
| 7,075,914 | B2* | 7/2006 | Kwan ............................ 370/338 |
| 7,110,759 | B2* | 9/2006 | Lewiner et al. ............ 455/426.2 |
| 7,209,471 | B2* | 4/2007 | Hong ............................ 370/349 |
| 7,231,451 | B2* | 6/2007 | Law et al. ..................... 709/230 |
| 7,340,214 | B1* | 3/2008 | Hamberg ...................... 455/41.2 |
| 7,352,997 | B2* | 4/2008 | Torvinen ...................... 455/41.2 |
| 7,471,655 | B2* | 12/2008 | Gallagher et al. ............ 370/329 |
| 7,546,099 | B2* | 6/2009 | Trost et al. ................. 455/186.1 |
| 7,606,190 | B2* | 10/2009 | Markovic et al. ............ 370/328 |
| 7,647,021 | B2* | 1/2010 | Moore et al. ................. 455/41.1 |
| 7,664,081 | B2* | 2/2010 | Luoma et al. ................. 370/338 |
| 7,672,662 | B2* | 3/2010 | Hamberg ...................... 455/411 |
| 7,698,698 | B2* | 4/2010 | Skan ............................. 717/168 |
| 7,894,808 | B2* | 2/2011 | Nakayama et al. ........... 455/419 |
| 2001/0055281 | A1* | 12/2001 | Kwan ............................ 370/280 |
| 2001/0055949 | A1* | 12/2001 | Law et al. ....................... 455/41 |
| 2001/0056501 | A1* | 12/2001 | Law et al. ..................... 709/248 |
| 2002/0065038 | A1 | 5/2002 | Nawata |
| 2002/0136214 | A1* | 9/2002 | Do et al. ........................ 370/392 |
| 2003/0003867 | A1* | 1/2003 | Kawamura ....................... 455/41 |
| 2003/0012219 | A1* | 1/2003 | Joo ............................... 370/449 |
| 2003/0021262 | A1* | 1/2003 | Ma et al. ....................... 370/352 |
| 2003/0140110 | A1* | 7/2003 | Cho ............................... 709/208 |
| 2003/0191940 | A1* | 10/2003 | Sinha et al. ................... 713/176 |
| 2004/0014422 | A1* | 1/2004 | Kallio .......................... 455/41.1 |
| 2004/0058651 | A1* | 3/2004 | Ross et al. ................. 455/67.11 |
| 2004/0198223 | A1* | 10/2004 | Loh et al. ..................... 455/41.1 |
| 2004/0203371 | A1* | 10/2004 | Loh et al. ..................... 455/41.2 |
| 2004/0204205 | A1* | 10/2004 | Goodjohn .................. 455/575.1 |
| 2005/0037708 | A1* | 2/2005 | Torvinen ...................... 455/41.2 |
| 2005/0070272 | A1* | 3/2005 | Marangos .................. 455/426.2 |
| 2005/0113066 | A1* | 5/2005 | Hamberg ....................... 455/411 |
| 2005/0136968 | A1* | 6/2005 | Nakayama et al. ......... 455/550.1 |
| 2005/0221766 | A1* | 10/2005 | Brizek et al. ..................... 455/73 |
| 2005/0265279 | A1* | 12/2005 | Markovic et al. ............. 370/328 |
| 2005/0272424 | A1* | 12/2005 | Gallagher et al. ......... 455/435.1 |
| 2005/0272449 | A1* | 12/2005 | Gallagher et al. ............ 455/458 |
| 2006/0075284 | A1* | 4/2006 | Skan ................................. 714/5 |
| 2006/0168261 | A1* | 7/2006 | Serval et al. .................. 709/230 |
| 2006/0173781 | A1* | 8/2006 | Donner ............................ 705/50 |
| 2007/0041360 | A1* | 2/2007 | Gallagher et al. ............ 370/352 |

FOREIGN PATENT DOCUMENTS

EP          1211821         6/2002

OTHER PUBLICATIONS

David Johnson, Hardware and Software Implications of Creating Bluetooth Scatternet Devices, IEEE Africon, 2004, p. 211-216.*
Pravin Bhagwat, Bluetooth: Technology for Short-Range Wireless Apps, IEEE Internet Computing, Jun. 2001. p. 96-103.*
802.15.1, Part 15.1: Wireless Medium Access control and Physical Layer (PHY) Specifications for Wireless Personal Area Network (WPANs), IEEE Computer Society, Jun. 14, 2002, p. 1-1169.*
Search Report Dated June 2, 2006.

* cited by examiner

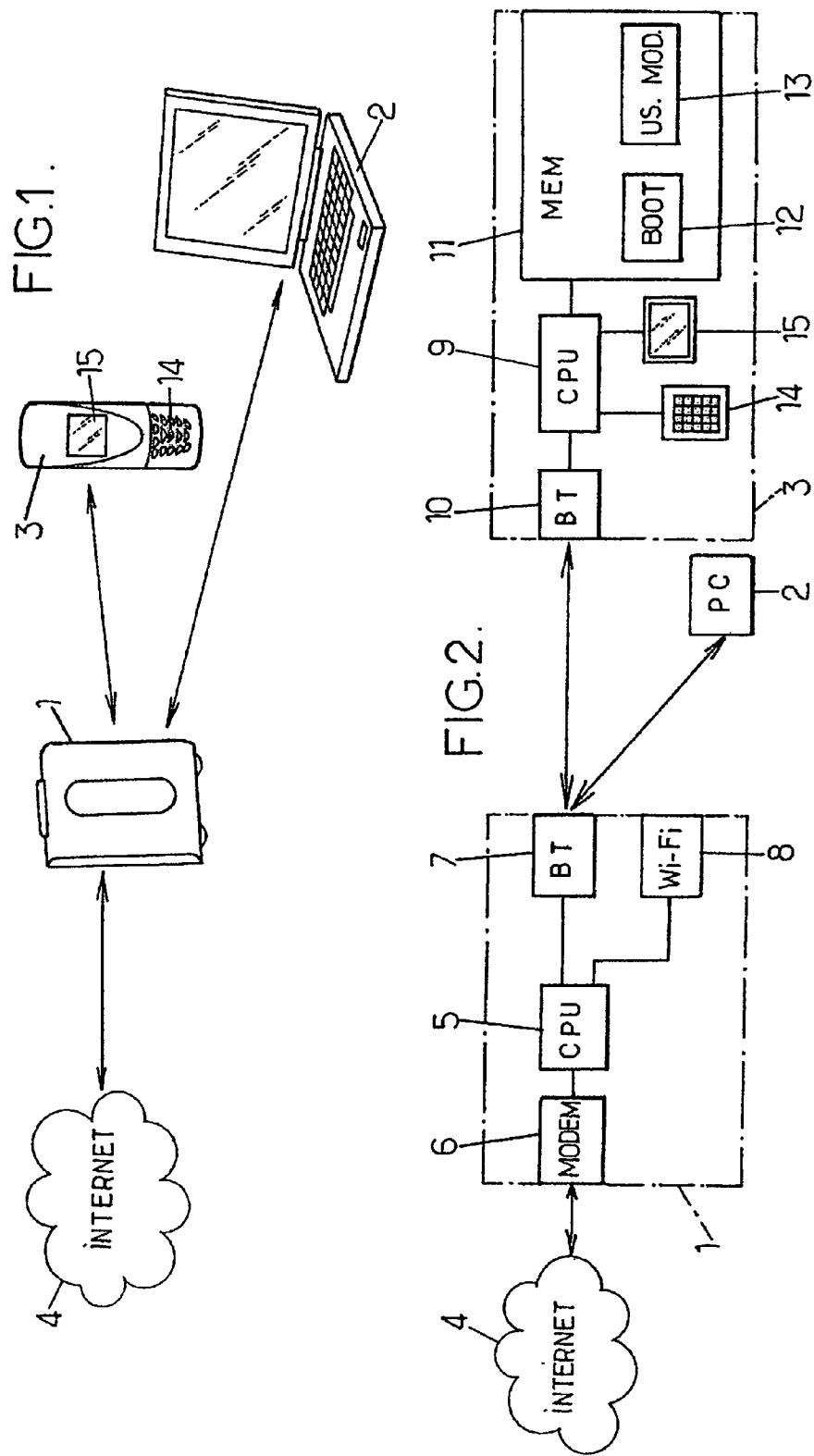

RADIO COMMUNICATION DEVICE AND RADIO COMMUNICATION SYSTEM COMPRISING SAME

This application claims the benefit, under 35 U.S.C. §365 of International Application PCT/EP2006/060165, filed Feb. 22, 2006, which was published in accordance with PCT Article 21(2) on Aug. 31, 2006 in English and which claims the benefit of French patent application No. 05/01954, filed Feb. 25, 2005.

The present invention relates to radiocommunication devices and the radiocommunication systems comprising such devices.

More particularly, the invention relates to a radiocommunication device comprising:
   at least one memory containing a starter software module and a use software module,
   at least one electronic processing unit linked to the memory,
   at least one radio circuit controlled by the processing unit,
the starter module being suitable to run automatically in the processing unit during the operation of the radiocommunication device,
the use module being suitable to, when it is run by the processing unit, enable radio communication between the radiocommunication device and a radiocommunication network according to a predetermined radiocommunication protocol.

The purpose of the present invention is to enable the easy updating of the use module of the radiocommunication device.

For this purpose, according to the invention, a radiocommunication device of the kind in question is characterized in that the starter module is suitable to:
   enable a simplified radio link of the radiocommunication device with the radiocommunication network,
   enable a downloading by the said simplified radio link, an update (full or partial) of the use module, and a storage of the said update in the memory of the radiocommunication device.

Only some layers of the said predetermined radiocommunication protocol are implemented to allow the said simplified radio link. Moreover, the layers implemented are limited to certain functionalities.

For example, in the case of Bluetooth protocol, a reduced number of layers will be implemented and the layers will be limited to the following functionalities:
   the "LC" layer (real time control of the radio link): limited to the simple multiplexing of data for the creation of connections,
   the "LM" layer (real time control of the radio link): limited to a negotiation restricted to the incoming connections, without audio, without authentication or encryption,
   the "L2CAP" layer: control, signalling and multiplexing limited to a single service,
   the service layer: downloading service.

Thanks to these arrangements, updates of the use module can be downloaded by radio channels, without the need to maintain this use module in operation during this update operation. The result is a great ease of updating and, if necessary a saving in memory since the update of the use module can simply erase all or part of the previous version of this module during the downloading.

Moreover, in diverse embodiments of the radiocommunication device according to the invention, it is possible to have recourse to one and/or other of the following arrangements:
   the starter module is suitable to store the update in the place of at least one part of the use module initially contained in the memory,
   the starter module is suitable to receive and recognise instructions via the simplified radio link,
   the starter module is suitable to receive by the said simplified radio link, a write instruction in the memory to store the said update in the memory,
   the starter module is suitable to receive by the said simplified radio link, an erase instruction of at least one part of the memory,
   the memory of the radiocommunication device includes a flash memory containing the use module,
   the starter module is suitable to:
   receive by the said simplified radio link, a consultation requesting information on the content of the memory,
   look for the said information and emit by the said simplified radio link, a response giving this information,
   the starter module is suitable to check the integrity of the downloaded update,
   the starter module has a normal operation mode driving the execution of the use module and a downloading mode enabling the download of an update of the use module and not driving the immediate execution of the use module, the said starter module being adapted for receiving by the said simplified radio link, an instruction for switching to normal operation mode,
   the use module is suitable to give the starter module an instruction for switching to normal operation mode,
   the radiocommunication device is a wireless telephone,
   the radiocommunication protocol is chosen from among the "BLUETOOTH", "Wi-Fi", "DECT" protocols.

Moreover, the purpose of the invention is also a radiocommunication system comprising a radiocommunication device as defined above and at least one radiocommunication base forming a local network with the said radiocommunication device and communicating with it according to the said radiocommunication protocol.

Moreover, in diverse embodiments of the radiocommunication system according to the invention, it is possible to have recourse to one and/or other of the following arrangements:
   the base is suitable to send instructions to the starter module by the said simplified radio link,
   the base is suitable to send to the starter module by the said simplified radio link, a write instruction to the memory of the radio communication device to store the said update in the memory,
   the base is suitable to store the said update at least partially in place of the pre-existing versions of the use module,
   the base is suitable to send the starter module by the simplified radio link, an erase instruction of at least one part of the memory of the radiocommunication device,
   the base is suitable to send to the starter module, a consultation requesting information on the content of the memory of the radiocommunication device, and the starter module is suitable to, following this consultation, search for the said information and send by the said simplified radio link, a response giving this information,
   the starter module is suitable to send to the base an integrity check information of the update downloaded, the base being suitable to check a download of the said update to the radiocommunication device again if the said integrity check information reveals an integrity fault,
   the said integrity check information is a signature calculated from the said update stored in the memory of the radiocommunication device, the base being suitable to determine whether this signature reveals an integrity fault and to then trigger a new download of the update by the said simplified radio link, the starter module has a normal operation mode driving a execution of the use module and a downloading mode enabling the download of an update of the use module and not driving the immediate execution of the use module, the base being suitable to send the starter module by the said simplified radio link, an instruction for switching to normal operation mode, the base is an access point to an external network.

The prior art knows, through the American patent U.S. Pat. No. 6,349,204 (British Telecommunications), a method of communication between a mobile phone and a base station. The procedure comprises a first consultation stage during which the base station sends a signal relating to a preferred operating mode and the mobile phone sends back a signal indicating whether or not its memory contains programme data corresponding to this preferred operating mode. If necessary, the base station sends the programme data in question. The base station and the mobile phone then operate in this preferred mode. In the case where the phone does not have enough memory the process is repeated until a suitable program is identified In this American patent application, the telephone does not have a starter module adapted for enabling a simplified radio link with a radiocommunication network in the sense of the present invention. The communication method of this American patent application is designed to used the best operating mode possible between the base station and the telephone, which is different from the purpose of the present invention.

The prior art also knows, through the American U.S. Pat. No. 6,622,617 (Cellco Partnership), a method used to add new functions to a mobile terminal. Plug-in modules are downloaded into the memory of the terminal. In this American patent application, the telephone does not have a starter module suitable to allow a simplified radio link with a radiocommunication network in the sense of the present invention.

The prior art also knows, through the European patent application EP 0 459 344 (Alcatel), a software downloading device for a mobile terminal. In this European patent request, the downloading is carried out by the standard radiocommunication network or else by an ISDN network, but in now case by a simplified radio link.

In view of the prior art and particularly the American patent U.S. Pat. No. 6,349,204, the problem that arises is to easily update the use module of the radiocommunication device.

Other characteristics and advantages of the invention will emerge upon reading the following description of one of its embodiments, provided as a non-restrictive example and referring to the annexed drawings.

In the drawings:

FIG. 1 is a functional diagram of a radiocommunication system according to an embodiment of the invention, and FIG. 2 is a block diagram showing part of the system of FIG. 1.

In the different figures, the same references designate identical or similar elements.

As shown in FIG. 1, the invention relates to a local radiocommunication system that can comprise for example a base 1 suitable to communicate according to several protocols with different entities such as a computer 2, a wireless telephone 3, the Internet network 4, etc.

The communication between the base 1 and some of these entities constituted by radiocommunication devices or terminals (particularly the computer 2 and the wireless telephone 3), can be carried by radio channels according to a local radiocommunication standard such as the "BLUETOOTH" standard, or even the "Wi-Fi" standard (IEEE 802.11b standard, or possibly IEEE 802.11a or g), or even the DECT standard.

Moreover, the base 1 also communicates with the Internet network (TCP/IP protocol), particularly through an "ADSL" link, or possibly by a V32, V32bis, V34, V90, V92 modem or other.

As shown in more detail in FIG. 2, the base 1 can comprise for example a processing unit 5 (CPU) which can communicate particularly with:

a modem 6, for example an ADSL modem in the example considered, enabling the communication with the Internet 4 network, a "BLUETOOTH" radio circuit 7 (BT) that is used to, in the example considered here, communicate with the computer 2 (PC) and the wireless telephone 3 by forming a local radio network communicating according to the "BLUETOOTH" protocol, and if necessary, a "Wi-Fi" radio circuit 8 being used to communicate with other terminals (computers or other devices) by forming a second local radio network communicating according to the "Wi-Fi" protocol.

Naturally, as explained previously, the above-mentioned ADSL, "BLUETOOTH" and "Wi-Fi" links are only given as examples and other types of links can be used.

Moreover, the wireless telephone 3 can comprise for example an electronic processing unit 9 (CPU) that communicates with:

a "BLUETOOTH" radio circuit (10) (or any other radio link protocol compatible with the radio links available on the base 1) adapted to communicate with the "BLUETOOTH" radio circuit (7) of the base 1, a memory 11 (for example a flash memory), particularly containing a starter software module 12 (BOOT) and a use module 13 (US. MOD.), a keypad 14, and a screen 15

In a manner known per se, the starter module 12 is run automatically on the processing unit 9 during each operation of the wireless telephone 3.

In normal operating mode of the wireless telephone 3, the starter module 12 thus checks that the use module 13 contained in the memory 11 is integral and if this is case, it loads this use module into the processing unit 9, which enables the operation of the wireless telephone 3 with all its functionalities (use of an extended "BLUETOOTH" protocol, complete operation of the user interfaces by means of the screen 15 and the keypad 14, complete operation of the telephony services and related services, etc.).

As an example, the normal radio link can implement an extended "BLUETOOTH" protocol comprising the following layers:

"LC" layer (real time control of the radio link):

real time management of the radio, time-division multiplexing of data/audio/page/request AFH (adaptive frequency hopping), "LM" layer (management and negotiation of the radio link):

negotiation of the incoming and outgoing connections, authentication, encryption check, negotiation for opening audio channels, power control, peripheral device search, response service to peripheral device searches, "L2CAP" layer:

control/signalling for the opening of inter-service links, multiplexing of data links between the different services.

If, during an operation of the wireless telephone 3, the starter module 12 detects a corruption of the use module 13, the said starter module 12 automatically switches to a download mode that will be described below, to update the user module 13.

Moreover, when the base 1 receives (for example by internet) an update of the use module 13, it can signal it to the use module 13 currently operating. In this case, the use module runs the execution of the starter module 12 in download mode, then the base 1 cuts the existing BLUETOOTH link and restarts a BLUETOOTH radio link, in such a manner that the starter module 12 starts back up in download mode.

When the starter module 12 is executed on the processing unit 9 in download mode, the said starter module 12 does not run the execution of the use module 13, but on the contrary establishes a simplified radio link (BLUETOOTH in the example considered here) and waits for the instructions of the base 1.

This simplified radio link is used to exchange certain predetermined messages with the base 1 particularly to receive instructions on this link and to download a full or partial update of the use module 13 (this update can be a new version of the use module 13 or simply the pre-existing version of this module, which is required to be reloaded onto the wireless telephone 3 from the base 1 if the starter module 12 has detected a corruption of the use module 13.

Hence, the simplified radio link, in contrast with the radio link that is established in normal operating mode, does not enable a telephony service or other services to be implemented from a download service. This simplified radio link can implement a reduced "BLUETOOTH" protocol comprising the following layers:
- "LC" layer (real time control of the radio link): limited to the simple multiplexing of data for the creation of connections,
- "LM" layer (real time control of the radio link): limited to a negotiation restricted to the incoming connections, without audio, without authentication or encryption,
- "L2CAP" layer: control, signalling and multiplexing limited to a single service,
- service layer: downloading service.

In the simplified radio link that is set up between the base 1 and the wireless telephone 3, the base is the master and the telephone the slave.

Initially, the base can send the telephone, via the simplified radio link, an initialization instruction (BTF_INIT), without which the starter module 12 of the telephone does not accept any other instruction. The starter module 12 then sends the base 1 a random authentication code, for example on 16 bytes, accompanied by a code indicating whether an authentication process is required. If this is the case, the base 1 sends the telephone an authentication message (BTF_SRES) function of the said random authentication code, message to which the starter module 12 responds to indicate whether the authentication was successful.

If this is the case, the base 1 sends the telephone 3, via the simplified radio link, a consultation (BTF_GET_FLASH_INFO) aiming to describe the memory 11. The starter module 12 responds to this consultation in particular by giving the number of sectors (coded into 2 bytes) used by the use module in the memory 11, the size of the sectors (coded into 4 bytes) and a memory page size (into 4 bytes).

The base 1 then sends via the simplified radio link, for each register of the memory 11, a read instruction (BTF_REG_READ) of this register by specifying the address (coded into 1 byte). In response to each of these instructions, the start module 12 sends the base 1 the content of the register specified, coded for example into 4 bytes.

Then the base 1 sends the telephone 3, for each sector of the memory 11 occupied by the use module, an erase instruction (BTF_FLASH_ERASE) giving the number of the sector to erase (coded in 1 byte). The starter module then runs this erase operation then informs the base 1 of the correct erasing of the sector required, for example by a message coded into 1 byte.

For each sector of the memory 11 previously erased, the base 1 thus sends the starter module 12 an update instruction (BTF_FLASH_WRITE) of the use module 13, each of these messages giving notably the start sector to write to in the memory 11, the length of the data then the data. The starter module controls the write operation of the data thus received in the required sectors, then sends the base 1 a report message indicating whether the write operation in the memory 11 was successful. The update instructions may concern 512 sectors at once, to accelerate the download process.

The base 1 then sends the telephone 3 an integrity check instruction (BTF_MISR) that can specify for example the start address and the length of the data to check. The start module 12 then calculates for example a 128-bit signature of the data recorded and sends it to the base 1 which can check whether the download was carried out correctly. If this is not the case (for example, if the download was interrupted by a power failure or other reason), the base 1 starts the download process again as described above.

Finally, the base 1 gives instruction to the starter module, by the simplified radio link, to switch to normal operating mode, and the starter module 12 switches to normal operating mode and sends back an acknowledgement message to the base 1. The base 1 thus causes a disconnection then reconnection of the radio link, such that the starter module switches to normal operation, as explained above.

Thanks to the arrangements described above, the size of the memory of the wireless telephone 3 can be reduced, and particularly can be clearly less than the memory size of the use module, since the use module 13 can be partially or totally erased during the downloading of the update, the wireless telephone thus continuing to operate in download mode with the starter module 12.

The invention claimed is:
1. Radiocommunication device comprising:
   at least one memory containing a starter software module and a use software module,
   at least one electronic processing unit linked to the memory,
   at least one radio circuit controlled by the processing unit,
   wherein the starter module is being configured to run automatically in the processing unit during the operation of the radiocommunication device,
   wherein the use module is being configured, when it is run by the processing unit, enable radio communication between the radiocommunication device and a radiocommunication network according to a Bluetooth protocol;
   wherein the starter module is configured to:
      setting up a simplified radio link of the radiocommunication device with the radiocommunication network;
      carrying out a download operation by the said simplified radio link, an update of the use module; and
      storing said update in the memory of the radiocommunication device;
   wherein the following layers of the Bluetooth protocol are implemented to allow the radio communication of said simplified radio link:

a "LC" layer (real time control of the radio link): the "LC" layer is limited to the simple multiplexing of data to create connections, a "LM" layer (real time control of the radio link): the "LM" layer is limited to a negotiation restricted to the incoming connections, without audio, without authentication or encryption, a "L2CAP" layer: the "L2CAP" layer is to control, signalling and multiplexing limited to a single service, a service layer: the service layer is configured to downloading service;

and wherein the starter module is configured to communicate with the radio circuit controlled by the processing unit to perform a normal operation mode and downloading mode, wherein the normal operation mode driving the execution of the use module, wherein the downloading mode enabling the download of an update of the use software module and not driving the immediate execution of use software module, the said starter module being adapted to receive an instruction to switch normal operation mode by the said simplified radio link.

2. Radiocommunication device according to claim 1 in which the starter module is configured to store the update in the place of at least one part of the use module initially contained in the memory.

3. Radiocommunication device according to claim 1 in which the starter module is configured to receive and recognise instructions via the simplified radio link.

4. Radiocommunication device according to claim 1, in which the starter module is configured to receive by the said simplified radio link, a write instruction in the memory to store the said update in the memory.

5. Radiocommunication device according to claim 1, in which the starter module is configured to receive by the said simplified radio link, an erase instruction of at least one part of the memory.

6. Radiocommunication device according to claim 1, in which the memory of the radiocommunication device includes a flash memory containing the use module.

7. Radiocommunication device according to claim 1, in which the starter module is configured to:

receive by the said simplified radio link, a consultation requesting information on the content of the memory, consult the said information and emit by the said simplified radio link, a response giving this said information.

8. Radiocommunication device according to claim 1, in which the starter module is configured to checking the integrity of the downloaded update.

9. Radiocommunication device according to claim 1, in which the use module is configured to give the starter module an instruction to switch to normal operation mode.

10. Radiocommunication device according to claim 1, constituting a wireless telephone.

11. Radiocommunication system device comprising a radiocommunication device according to claim 1 and at least one radiocommunication base forming a local network with the said radiocommunication device and communicating with it according to the Bluetooth protocol.

12. Radiocommunication device according to claim 9, in which the base is configured to send instructions to the starter module by the said simplified radio link.

13. Radiocommunication device according to claim 10, in which the base is configured to send the starter module by the said simplified radio link, a write instruction to the memory of the radiocommunication device to store the said update in the memory.

14. Radiocommunication device according to claim 10, in which the base is configured to store the said update at least partially in place of the pre-existing versions of the use module.

15. Radiocommunication device according to claim 10, in which base is configured to send the starter module by the said simplified radio link, an erase instruction of at least one part of the memory of the radiocommunication device.

16. Radiocommunication device according to claim 10, in which base is configured to sending the starter module, a consultation requesting information on the content of the memory of the radio communication device and the starter module is configured to, following this consultation, consult the said information and send by the said simplified radio link, a response giving this said information.

17. Radiocommunication device according to claim 10, in which the starter module is configured to send the base an integrity check information of the update downloaded, the base being configured to control a download of the said update to the radiocommunication device again if the said integrity check information reveals an integrity fault.

18. Radiocommunication device according to claim 14, in which the said integrity check information is a signature calculated from the said update stored in the memory of the radiocommunication device, the base being configured to determine whether this signature reveals an integrity fault and to then trigger a new download of the update by the said simplified radio link.

19. Radiocommunication device according to claim 10, in which the starter module has a normal operation mode driving an execution of the use module and a download mode enabling the download of an update of the use module and not driving the immediate execution of the use module, the base being configured to send the starter module by the said simplified radio link, an instruction to switch to normal operation mode.

20. Radiocommunication device according to claim 9, in which the base is an access point to an external network.

\* \* \* \* \*